No. 880,812. PATENTED MAR. 3, 1908.
G. P. McARTHUR.
EVAPORATING APPARATUS.
APPLICATION FILED SEPT. 17, 1906.
3 SHEETS—SHEET 1.
FIG. I.
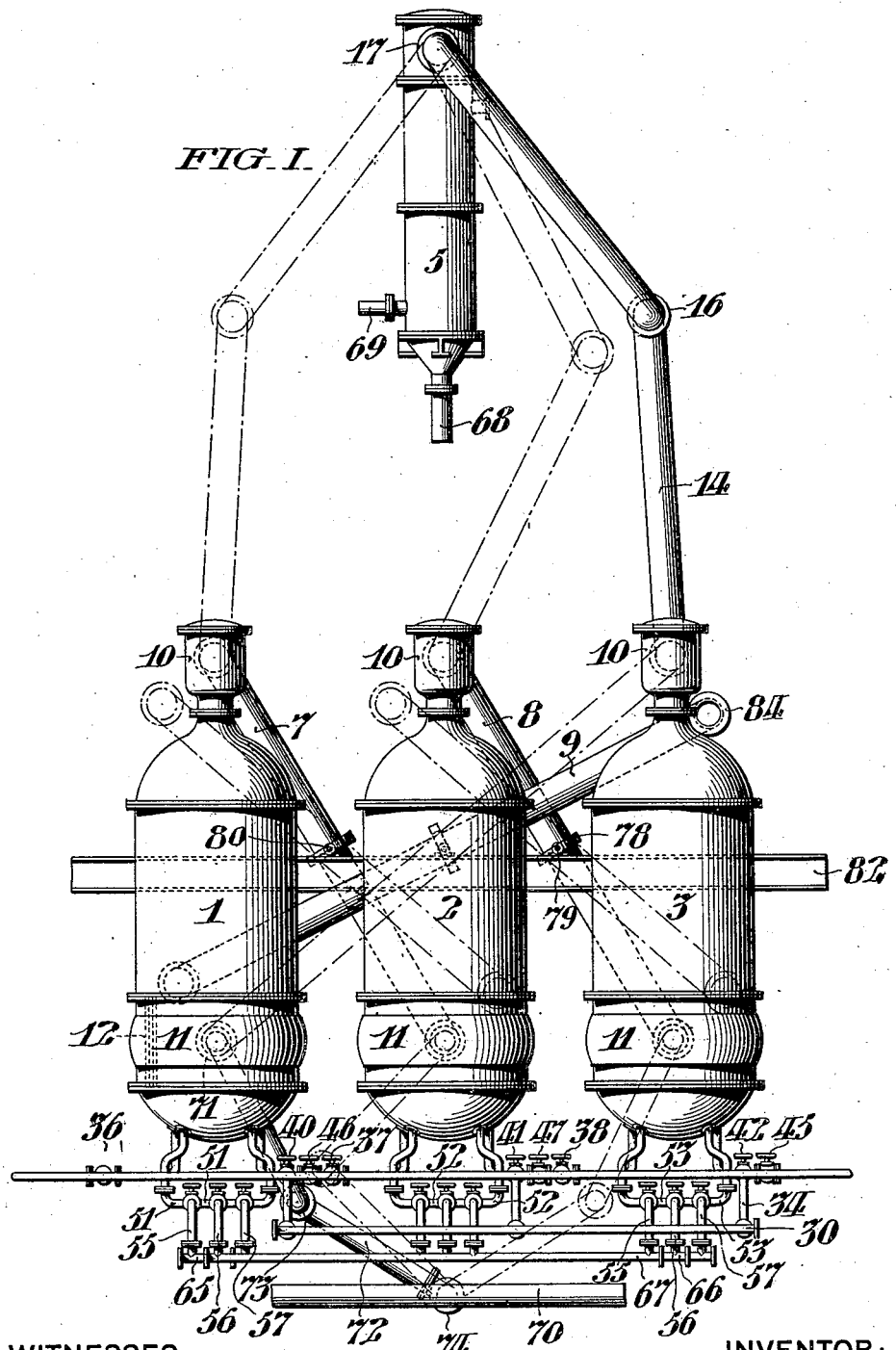
WITNESSES:
INVENTOR:
GEORGE P. McARTHUR, No. 880,812. PATENTED MAR. 3, 1908.
G. P. McARTHUR.
EVAPORATING APPARATUS.
APPLICATION FILED SEPT. 17, 1906.
3 SHEETS—SHEET 2.
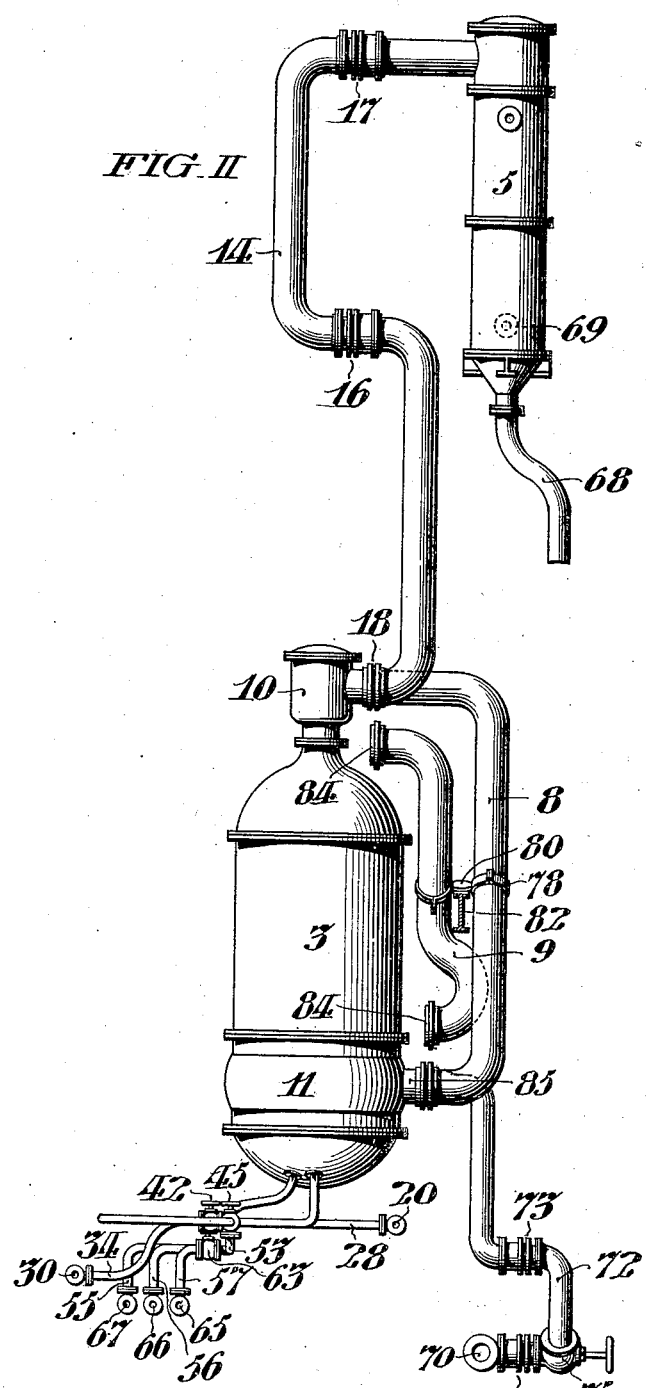
FIG. II
WITNESSES:
INVENTOR:
GEORGE P. McARTHUR, No. 880,812. PATENTED MAR. 3, 1908.
G. P. McARTHUR.
EVAPORATING APPARATUS.
APPLICATION FILED SEPT. 17, 1906.
3 SHEETS—SHEET 3.
FIG. III.
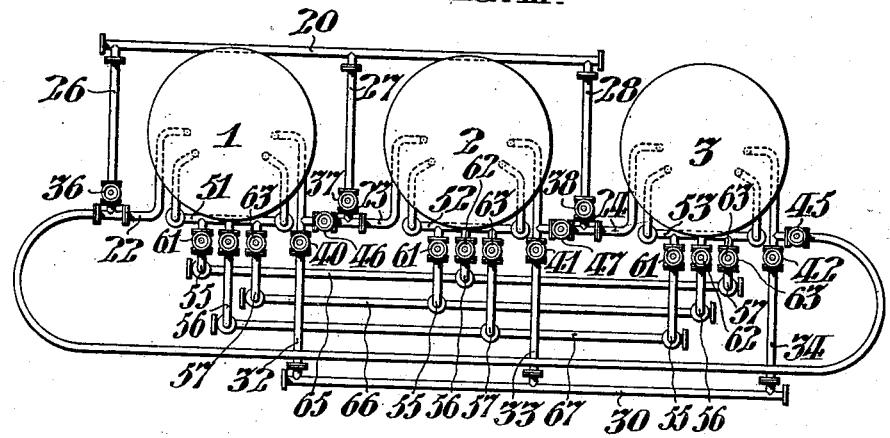
FIG. IV.
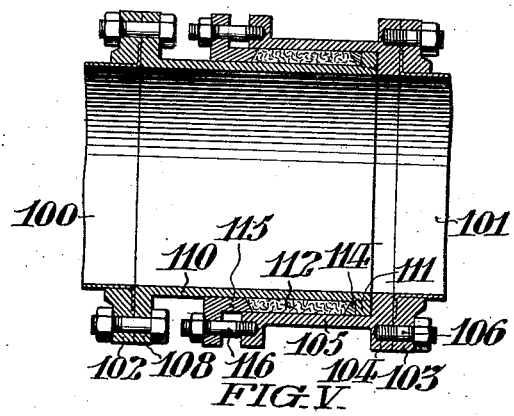
FIG. V.
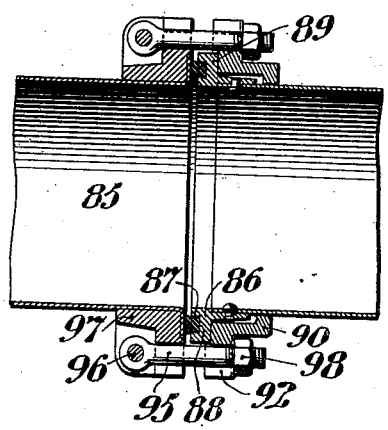
WITNESSES:
Clifton C. Hallowell
John C. Bergner
INVENTOR:
GEORGE P. McARTHUR,
by Arthur E. Craig
Atty.

UNITED STATES PATENT OFFICE.

GEORGE P. McARTHUR, OF ROCKLEDGE, PENNSYLVANIA.

EVAPORATING APPARATUS.

No. 880,812.　　　Specification of Letters Patent.　　　Patented March 3, 1908.

Application filed September 17, 1906. Serial No. 334,935.

*To all whom it may concern:*

Be it known that I, GEORGE P. McARTHUR, of Rockledge, in the county of Montgomery and State of Pennsylvania, have invented certain new and useful Improvements in Evaporating Apparatus, whereof the following is a specification, reference being had to the accompanying drawings.

My improvements relate to evaporating apparatus comprising a plurality of pans, in which the liquor to be evaporated may be successively introduced into, and discharged from any of the pans in the series.

It is the object of my invention to provide such an apparatus with movable connection pipes, whereby the respective pans in the series may be differently connected, and any pan in said series may be constituted the initial pan, to which the movable steam inlet pipe is detachably connected, and any of said pans in said series may be constituted the terminal pan, to which the movable condensation pipe is removably attached.

My invention further comprises means carried by said pipes whereby they are readily connected, with said pans, and means included in said pipes whereby they are rendered flexible, and are thereby capable of being shifted to connect with selected pans.

The form of my invention as hereinafter described comprises a plurality of evaporating pans whose respective vapor chambers are connected with the respective heating drums of the next succeeding pans in the series, by movable vapor pipes which are centrally pivoted and which comprise means whereby they are detachably connected with said pans; a steam supply pipe and a vapor outlet pipe, each comprising a flexible joint, and a union whereby they may be respectively connected in detachable relation with the heating drum of any pan which for the time being is constituted the initial pan, and with the vapor chamber of the pan which is constituted the terminal pan.

My invention further includes the various novel features of construction and arrangement hereinafter more definitely described and claimed.

In the accompanying drawings, Figure I, is a front elevation of a triple effect evaporator conveniently embodying my improvements. Fig. II, is an end elevation as seen from the right of Fig. I. Fig. III, is a diagrammatic plan view of said evaporator. Fig. IV, is a central longitudinal section through one of the flexible joints. Fig. V, is a central longitudinal section through one of the unions.

In said figures;—the evaporating pans 1, 2, and 3, are conveniently disposed in alinement beneath the condenser 5, and are arranged to be connected with each other by the vapor pipes 7, 8, and 9, which may extend from the vapor chamber 10, of one pan to the heating drum 11, of another pan of the series. As shown in Fig. I, said pipes 7, and 8, are arranged to connect adjacent pans, and the pipe 9, is arranged to connect the end pans. Said pans are arranged to be successively placed into communication with the condenser 5, by the pipe 14, which is provided with the flexible joints 16, and 17, to be further described hereinafter, and which is provided at its free end with a union 18, arranged to be connected with the vapor chamber 10, of any selected pan 1, 2, or 3.

The weak liquor to be concentrated is supplied through the conduit 20, which is connected with the inlets 22, 23, and 24, of the respective pans 1, 2, and 3, by the respective branches 26, 27, and 28. Said pans 1, 2, and 3, being similarly connected with the discharge conduit 30, through the branch outlets 32, 33 and 34, respectively. The branches 26, 27 and 28, are conveniently controlled by the valves 36, 37 and 38, respectively, whereby any pan of the series may be elected the initial one; likewise the branch outlets 32, 33 and 34, are provided with the valves 40, 41 and 42, respectively arranged to control the final discharge of concentrate or thick liquor, whereby any pan of the series may be elected the terminal one.

As best shown in Fig. III, the inlets 22, 23 and 24, of the respective pans 1, 2, and 3, are exteriorly connected to the outlets 34, 32 and 33, of the respective pans 3, 1, and 2, and said inlets 22, 23 and 24, respectively include valves 45, 46, and 47, arranged to control the flow of liquor, and to determine whether it shall be discharged into the next pan of the series, or to the thick liquor discharge conduit 30. The heating drums 11, of the pans 1, 2, and 3, are respectively provided with condensation drain pipes 51, 52, and 53, each of which comprise the pipe connections 55, 56, and 57, respectively controlled by the valves 61, 62, and 63, and differently connected respectively with the pipe 65, which leads to boilers; the pipe 66, which leads to hot well; and the pipe 67, which leads to drain pump. It may be seen that the vapors issuing from the liquor in what may be constituted the first and second pans of the series, may be utilized to heat the pans which, at the same time, constitute the second and third in said series, respectively. Said vapors are condensed and discharged as water through the condensation pipes 52, and 53, when the pan 1, is used as the initial one, as will be described at length hereinafter. The vapor from the last pan of the series is conveyed through the pipe 14, to the condenser 5, where said vapor is condensed and the condensate conveyed through the drip tail pipe 68, to the hot well with about thirty times its volume of other water whereby it has been condensed. Said condenser is provided with a pipe 69, leading to a vacuum pump, whereby the rate of vaporization of the liquor in the pans is greatly increased.

As best shown in Fig. I, the steam main 70, is arranged to be selectively connected to the steam drum of any pan in the series, which may be elected the initial pan, by the steam inlet pipe 72, which comprises the union 71, and the flexible joints 73, and 74, and which is provided with the controlling valve 75, local to said flexible joint 74. The vapor pipes 7, 8, and 9, as best shown in Figs. I, and II, are arranged to oscillate from their positions shown in full lines in Fig. I, as indicated by the dot and dash lines in said figure. Said pipes are provided with the bands 78, having the trunnions 79, journaled in the bearings 80, which are conveniently carried by the I beam 82, supported by suitable building construction. The free ends of the vapor pipes 7, 8, and 9, are provided with unions 84, similar to the unions 18, and 71, on the pipes 14, and 72, respectively. Said unions are arranged to be detachably secured to the branches 85, on the pans 1, 2, or 3; and as best shown enlarged in Fig. V, comprise the ring 86, in stationary relation with the pivoted pipes. Said ring is provided with the gasket 87, conveniently formed of rubber embedded in the groove 88, and arranged to engage the flanged end of the branch 85, to which it is attached.

A loose collar 90, girdles the ring 86, and bears against its flange 89, and is provided with a series of notches 92, in its periphery which may be shifted by rotating said collar, to receive the swing bolts 95, which are pivoted at 96, in the ring 97, in stationary relation with the end of said branch 85, and which are provided with nuts 98, in threaded engagement with their free ends, arranged to be rotated to thereby render the gasketed joint vapor tight.

The flexible joints included in the pipes 14, and 72, which render said pipes capable of connection with any selected pan in the series, comprise stuffing boxes as best shown enlarged in Fig. IV, wherein the adjacent ends of the pipe sections 100, and 101, of the pipes 14, and 72, are respectively provided with flanges 102, and 103, the latter being secured to the flange 104, of the stuffing box 105, by the bolts 106, and the former being secured to the flange 108, of the tubular member 110, which extends into said stuffing box and which is provided with a ring 111, which is secured thereto, and which forms a flange arranged to prevent the accidental removal of said member 110, when the packing 112, is in place.

A bearing ring 114, is loosely inserted in the stuffing-box between the ring 111, and the packing 112, all of which are conveniently held in place by the follower 115, which is arranged to be secured in adjustable relation to the stuffing box 105, by the bolts 116. It may be readily seen that by the arrangement just described, the sections 100, and 101, may be readily rotated relatively.

The operation of the apparatus is as follows:—It being desired to initially introduce thin liquor into the pan 1, and to finally discharge the concentrate or thick liquor from the pan 3, the valves 36, 46, 47 and 42, are opened, and all others in the liquor line closed, thereby permitting the liquor to flow from the weak liquor supply conduit 20, successively through the pans 1, 2, and 3, its specific gravity constantly increasing until it is discharged from the pan 3, through the branch outlet 34, to the thick liquor conduit 30. The steam pipe 72, is connected to the steam drum 11, of the pan 1, and the liquor contained in said pan is vaporized by the steam in contact with the tubes 12, in said drum; the vapor in the pan 1, rises to the vapor chamber 10, from whence it is conveyed by the vapor pipe 7, to the drum 11, of the pan 2, to heat and vaporize the liquor therein contained; the vapor in the pan 2, rising to vapor chamber 10, in said pan 2, from whence it is conveyed by the vapor pipe 8, to the drum 11, of the pan 3, where it serves to heat the liquor therein contained, the vapor arising to the vapor chamber 10, of said pan 3, is conveyed therefrom by the pipe 14, to the condenser 5, wherein it is condensed by cold water and flows through the pipe 68, to the hot well. In order to connect the condensation pipes 51, 52, and 53, of the respective pans 1, 2, and 3, with the boiler, the hot well, and the drain pump respectively when the pan 1, is the initial pan, each of the valves 61, are opened and the valves 62, and 63, closed. If it is desired to constitute the pan 2, as the initial pan, the valves 37, 47, 45, and 40, are opened, and all others in the liquor line closed, with the effect that the thin liquor is introduced through the branch 27, and inlet 23, to the pan 2, thence to the pan 3, from which it passes through the valve 45, and inlet 22, to the pan 1, from where it is discharged through the branch outlet 32, to the thick liquor conduit 30.

The vapor pipe 7, which in the first instance, connected the pans 1, and 2, is, in the latter instance, disconnected and shifted to the position shown in dot and dash lines in Fig. I; also the vapor pipe 9, is shifted to connect the vapor chamber 10, of the pan 3, with the steam drum 11, of the pan 1; the steam inlet pipe 72, is connected to the steam drum 11, of the pan 2; and the vapor outlet pipe 14, is connected to the vapor chamber 10, of the pan 1, with the effect that the liquor in the pan 2, is heated by the steam in the drum 11, the vapor passing through the pipe 8, to the drum 11, of the pan 3, the vapor from pan 3, passing through the pipe 9, to the drum 11, of the pan 1, and the vapor from pan 1, passing through the pipe 14, to the condenser 5, and thence, in condensed form, through the pipe 68, to hot well. In this instance, all of the valves 62, are opened and the valves 61, and 63, closed, with the result that the condensation pipes 52, 53, and 51, are respectively connected with the boilers, the hot well, and the drain pump.

If it is desired to establish the pan 3, as the initial pan of the series, the vapor pipe 7, is again connected as shown in full lines in Fig. I; the vapor pipe 8, is disconnected as shown in dot and dash lines in said figure; the vapor pipe 9, connects the pans 3, and 1, as in the second instance; the steam inlet pipe is connected with the steam drum 11, of the pan 3; and the pipe 14, is connected to the vapor chamber 10, of the pan 2. The valves 38, 45, 46, and 41, are opened and all of the other valves of the liquor line closed, thus directing the liquor through the branch 28, inlet 24, to the pan 3, through the valve 45, and inlet 22, to the pan 1, to pan 2, from where it is discharged through the branch outlet 33, to the thick liquor conduit 30. All of the valve 63, being opened and the valves 61, and 62, closed, the condensation pipes 53, 51, and 52, are respectively connected to the boilers, the hot well, and the drain pump. It may be seen that, by successively constituting each pan, the initial pan of the series, at intervals such as will insure that any nonvolatile deposits on the heating surface, in the apparatus will be resolved by the thin liquor and discharged with the concentrate, the apparatus may be continuously operated, without the necessity of the usual suspension of operation for cleaning said deposit from the tubes.

Although I have shown and described an apparatus comprising three pans in straight alinement, it is to be understood that it may conveniently include any number of pans arranged in circular form or otherwise disposed; therefore, I do not desire to limit myself to the precise details of construction and arrangement herein set forth as it is obvious that various modifications may be made therein without departing from the essential features of my invention.

I claim:—

1. An evaporating apparatus, comprising a plurality of pans arranged to contain a liquid, and provided with means arranged to vaporize said liquid; and means comprising movable rigid pipe sections adapted to direct the vapor from one pan to another in different order, in accordance with the variable connection of said pipe with said pans, substantially as set forth.

2. An evaporating apparatus comprising a plurality of pans arranged to contain a liquid, and provided with means arranged to vaporize said liquid; and means comprising movable rigid pipe sections having a detachable connecting device, adapted to direct the vapor from one pan to another in different order, in accordance with the variable connection of said pipe with said pans, substantially as set forth.

3. An evaporating apparatus, comprising a plurality of pans arranged to contain a liquid, and provided with means arranged to vaporize said liquid; and means comprising a pivoted pipe adapted to direct the vapor from one pan to another in different order, in accordance with the variable connection of said pipe with said pans, substantially as set forth.

4. An evaporating apparatus, comprising a plurality of pans arranged to contain a liquid, and provided with means arranged to vaporize said liquid; and means comprising a movable pipe, having a pivoted joint intermediate of its ends, and adapted to direct the vapor from one pan to another in different order, in accordance with the variable connection of said pipe with said pans, substantially as set forth.

5. An evaporating apparatus, comprising a plurality of pans arranged to contain a liquid, and provided with means arranged to vaporize said liquid; a steam supply pipe; a condenser; and detachable movable rigid pipe sections, arranged to connect said steam supply pipe and said condenser respectively with any selected pans in series, in accordance with the adjusted position of said movable pipes, substantially as set forth.

6. In evaporating apparatus, the combination with a series of evaporating pans, arranged to contain liquid and provided with means arranged to vaporize said liquid; fluid outlets on the respective pans, presented in a common plane; and, means adapted to selectively connect said outlets in different order, comprising movable rigid pipe sections, and means limiting the movement of said pipe to said plane, substantially as set forth.

7. An evaporating apparatus, comprising a plurality of pans arranged to contain a liquid, and provided with means arranged to vaporize said liquid; and means constructed and arranged to change the direction of traverse of the vapor from one pan to another, including an adjustable pipe provided with means constructed and arranged to variably connect it in different angular positions in hermetically closed relation with said apparatus, substantially as set forth.

8. An evaporating apparatus, comprising a plurality of pans arranged to contain a liquid, and provided with means arranged to vaporize said liquid; and means constructed and arranged to change the direction of traverse of the vapor from one pan to another, including a movable pipe provided with means constructed and arranged to detachably connect it in different positions in hermetically closed relation with said apparatus.

In testimony whereof, I have hereunto signed my name at Philadelphia in the county of Philadelphia and State of Pennsylvania, this fifteenth day of September, 1906.

GEO. P. McARTHUR.

Witnesses:
W. HARRIS SELTZER,
WM. A. DOUGLASS.